United States Patent [19]

Lin

[11] Patent Number: 5,518,096
[45] Date of Patent: May 21, 1996

[54] REAR HUB TRANSMISSION MECHANISM FOR BICYCLES

[76] Inventor: Tsun-Huo Lin, No,65, Hsiao Wu Road, Chu Ying Li, Ho Mei Town, Changhua, Taiwan

[21] Appl. No.: 375,417

[22] Filed: Jan. 18, 1995

[51] Int. Cl.⁶ .................................................. F16D 41/24
[52] U.S. Cl. ............................................. 192/64; 301/110.5
[58] Field of Search .................................. 192/64, 41 R, 192/46; 301/105.1, 110.5

[56] References Cited

U.S. PATENT DOCUMENTS

| | | | |
|---|---|---|---|
| 4,913,500 | 4/1990 | Wauke et al. | 192/64 |
| 5,458,223 | 10/1995 | Chen | 192/64 |
| 5,460,254 | 10/1995 | Huang | 192/64 |

FOREIGN PATENT DOCUMENTS 717959  1/1932  France ..................... 192/64

*Primary Examiner*—Andrea L. Pitts
*Attorney, Agent, or Firm*—Beveridge, DeGrandi, Weilacher & Young

[57] ABSTRACT

An improved rear hub transmission mechanism for use in bicycles including a hub body, an axle, a sleeve, and a driving assembly. The hub body has a through hole and an axle assembly. The through hole is circumferentially provided with a plurality of grooves and has a polygonal hole and a round hole at either ends thereof. The sleeve has a lower section having external threads and a bracing section, and an upper section having a plurality of grooves and a flange. The grooves in the sleeve lock with the grooves in the through hole while the flange fits in with the polygonal hole of the through hole when the sleeve is inserted into the through hole. The driving assembly consists of a mounting, a plurality of resilient members and retaining elements, and a gear seat. One end of the mounting is provided with a tube for insertion into the round hole of the through hole for positioning the sleeve. When a gear on the gear seat is rotated, the gear seat and the retaining elements engage with each other, and the flange of the sleeve and the grooves drive the hub body to rotate in a single direction.

5 Claims, 9 Drawing Sheets

REAR HUB TRANSMISSION MECHANISM FOR BICYCLES

BACKGROUND OF THE INVENTION (a) Technical Field

The present invention relates to an improved rear hub transmission mechanism for use in bicycles.

(b) Description of the Prior Art

At present, light materials like aluminum alloys are gradually replacing iron material in the manufacture of bicycles. But aluminum alloys are too soft. Therefore, manufacturers have to use iron along with aluminum in manufacturing the rear hub transmission mechanisms. The conventional rear hub transmission is as shown in FIG. 1. It mainly comprises a hub body 1 having a through hole 1a in the center thereof for insertion of an axle 2. One end of the hub body 1 is provided with a ball bearing slot 1b for accommodating a ball bearing 3, so that by means of a nut set 3a which screws onto the axle 2, the ball bearing 3 is positioned on the hub body 1. The other end of the through hole 1a of the hub body 1 is internally provided with threads 1c, and a tube 1d projects therefrom. The tube 1d is circumferentially provided with a plurality of recesses 1e. The rear hub transmission of the conventional type further comprises a driving assembly which consists of a mounting 4, a pre-determined number of retaining elements 5, resilient elements 6 and a gear seat 7. The mounting 4 is circumferentially provided with a predetermined number of notches 4a for receiving the retaining elements 5, which are subject to the pressure of the resilient elements 6 at any time. The interior surface of one end of the mounting 4 is circumferentially provided with a plurality of teeth 4b. After the mounting 4 is passed through the axle 2, the teeth 4b at one end of the mounting 4 lock into the recesses 1e of the tube 1d at one end of the hub body 1. The inner surface of the gear seat 7 is also provided with tooth-like ratchet 7a. An inner tube 8 having external threads 8a at one end thereof is passed through a double row ball bearing 9 into a central through hole of the mounting 4 and locked with the internal threads 1c at one end of the through hole 1a of the hub body 1. A sleeve 9a and a nut 9b are used to press the above-mentioned components tightly onto the hub body 1. The outer surface of the gear seat 7 is provided with a gear so that, by means of the assembly described above, when the gear is driven, the hub body 1 may be driven to rotate in a single direction. From the above-mentioned mechanism, it can be seen that when the cyclist pedals the bicycle and the chain causes the gear to turn and brings the gear seat 7 to turn forward, the inner ratchet 7a of the gear seat 7 lock with the retaining elements 5 of the mounting 4 to link-up with the mounting 4, and the teeth 4b in the inner surface of one end of the mounting 4 mesh with the recesses 1b of the tube 1a at one end of the hub body 1 to cause them to move forward. And when the cyclist pedals the bicycle so that the chain engages the gear of the gear seat 7 to turn backward, the ratchet 7a release the retaining elements 5 of the mounting 4 to produce idle rotation.

However, in the conventional methods of using the chain to rotate the gear, the point of application deviates to one side of the hub body 1, and because the recesses 1e of the tube 1d of the hub body 1 and the internal teeth 4b of the mounting 4 are separately molded, there is a relatively considerable difference in their concentricity, which means that there is a greater clearance between the two components so that shock may be easily generated. Besides, since the hub body is formed of soft aluminum material while the mounting 4 is formed of iron material, coupling of the hub body 1 and the mounting 4 is poor. And because the force is received on one side, (which creates torque concentration at one spot), the existing clearance gradually enlarges and the hub body 1 and the mounting 4 become loosened from each other. Therefore, the chain may have a greater swing, which may cause the chain to slip off the bicycle, or the pins of the chain may easily drop off and the chain may easily break if the chain constantly swings to and fro for a long period of time. There are latent dangers, such as poor coupling strength, in this conventional mechanism. After the rear hub transmission of the present invention is assembled, the duration of the bicycle is definitely affected by the poor connection of the mounting and the hub.

In another embodiment of the prior art as shown in FIG. 2, the conventional rear hub transmission mechanism mainly comprises a hub body 1, which has a through hole 1a, the central portion of the hub body 1 is provided with a through hole 1a for insertion of an axle 2. One end of the through hole is provided with a ball bearing slot 1b which receives a ball bearing 3. A nut set 3a is screwably provided on the axle 2 to position the ball bearing 3 on the hub body 1. The inner surface of one end of the through hole 1a of the hub body 1 is provided with a plurality of internal threads 1c. The rear hub transmission mechanism further comprises a driving assembly which consists of a mounting 4, a plurality of rollers and a gear set 6. One end of the mounting 4 extends integrally to form a tube 34a which is externally provided with external threads 41a. The mounting 4 is passed through the axle 2 so that one end thereof is tightened with the internal threads 1c at one end of the through hole 1a of the hub body 1. The inner surface of the gear seat 6 is also provided with tooth-like ratchet 6a so that the rollers 5 may be inserted into the clearances inside the gear seat 6. The circumferential surface of the rollers 5 matches with and contacts a cylindrical body 5a having a suitable resilience. The interior of the rear end of the gear seat 6 is fitted with a double row ball bearing 6a so that by utilizing a sleeve 7 and a nut 7a, the above components are pressed tightly onto the hub body 1. The outer surface of the gear seat 6 is provided with a gear so that by driving the gear, the hub body is driven to rotate unidirectionally.

In the above-mentioned mechanism, the external threads 41a of the tube 4a at one end of the mounting 4 mesh with the internal threads 1c at one end of the hub body. But there is a deviation in their concentricity when their respective threads are formed. As the hub body is made of soft aluminum material while the mounting is made of iron material, their connection is poor; besides, there is the concentration of torque. Consequently, when the mounting 4 rotates forward, there is a tendency that it may screw into the hub body 1, and because internal threads 1c for engaging with the external threads 41a of the mounting 4 are also formed of soft material, the contact surface (also formed of soft material) of the hub body 1 in contact with the mounting 4 is gradually worn away due to constant abrasion and pressure, so that the mounting 4 goes deeper into the internal threads 1c at one end of the through hole 1a of the hub body 1, affecting their coupling precision. Because the internal threads 1c are worn away, the clearance between the internal threads 1c and the external threads 41a becomes enlarged. Hence, the gear swings through a greater angle, causing the chain to slip off. And because the chain constantly swings to and fro, the pins of the chain may also slip out, causing the chain to break. Therefore, there are many latent dangers, and the duration of the bicyle is inevitably shortened because of the poor connection between the hub body and the mounting.

SUMMARY OF THE INVENTION

The primary object of the present invention is to provide an improved rear hub transmission wherein the shock absorbing power of the rear hub transmission is enhanced and the problem of lossening is also eliminated, hence increasing the duration of a bicycle.

Another object of the present invention is to provide an improved rear hub transmission, wherein the through hole and the mounting have a better concentricity and a larger and more even surface of contact between them so that there may be a better coupling precision between the mounting and the hub body, reducing the clearance at their joints and enhancing the coupling strength of the hub body.

A further object of the present invention is to provide an improved rear hub transmission wberein the coupling of the sleeve, the mounting and the hub body is enhanced.

To achieve the above-mentioned objects, the improved rear hub transmission mechanism according to the present invention comprises a hub body having a through hole with an axle inserted therethrough. The through hole is circumferentially provided with a plurality of grooves and has a polygonal hole and a round hole at either ends thereof. The sleeve has a lower section having external threads and a bracing section, and an upper section having a plurality of grooves and a flange. The grooves in the sleeve lock with the grooves in the through hole while the flange fits in with the polygonal hole of the through hole when the sleeve is inserted into the through hole. The driving assembly consists of a mounting, a plurality of resilient members and retaining elements, and a gear seat. One end of the mounting is provided with a tube for insertion into the round hole of the through hole for positioning the sleeve. The sleeve is rotated through the mounting, and by means of the polygonal flange and the elongated grooves which engage with those in the through hole of the hub body, stress is axially distributed on the sleeve to prevent concentration of torque. The axial support afforded by the sleeve also help enhancing the shock absorbing capability of the hub body. The round hole at one end of the through hole of the hub body and the tube of the mounting are formed in NC90 degrees, having better concentricity, Furthermore, the contact surface between the mounting and the hub body as well as the outer plane of the round hole of the hub body have greater and more even contact effects, providing better coupling precision between the mounting and the hub body. The sleeve is fitted into the through hole of the hub body with the external threads of its lower section locking into the internal threads of the tube at one end of the mounting. The bracing section of the lower section of the sleeve just fits with the bracing surface at the outer end of the internal threads of the tube of the mounting, so that the sleeve and the mounting are firmly joined together to prevent the sleeve from locking into the internal threads of the tube of the mounting when the hub body rotates forward. And because the sleeve and the mounting are both made of rigid material, the hub body will not easily become loosened after it is pressed by the sleeve when the mounting rotates; the sleeve and the internal threads of the tube of the mounting may not easily be damaged too. Hence, the sleeve, the hub body and the mounting are more firmly secured together.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
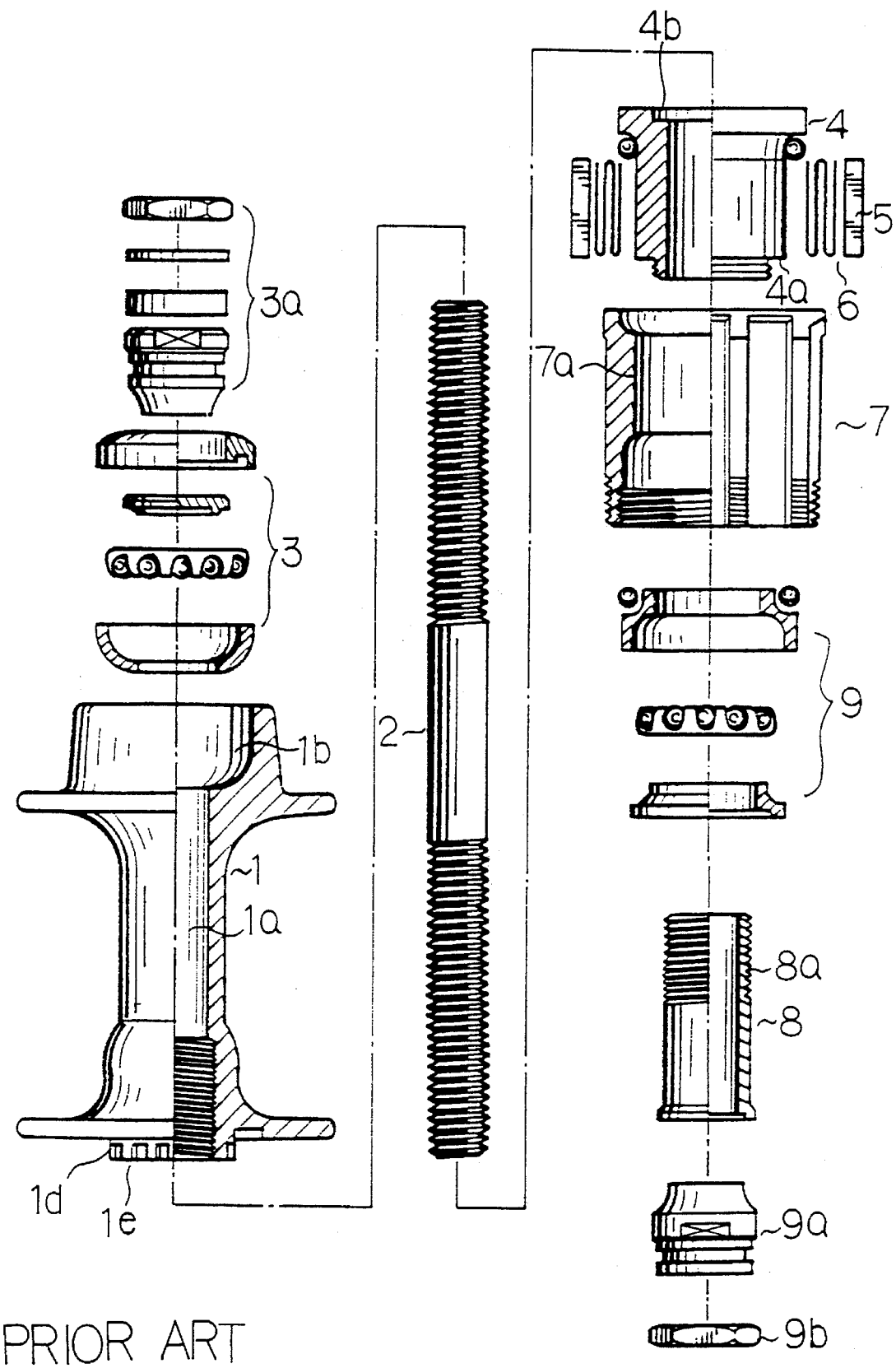
FIG. 1 is an exploded schematic view of a conventional aluminum alloy rear hub mechanism of a bicycle.
Figure 2:
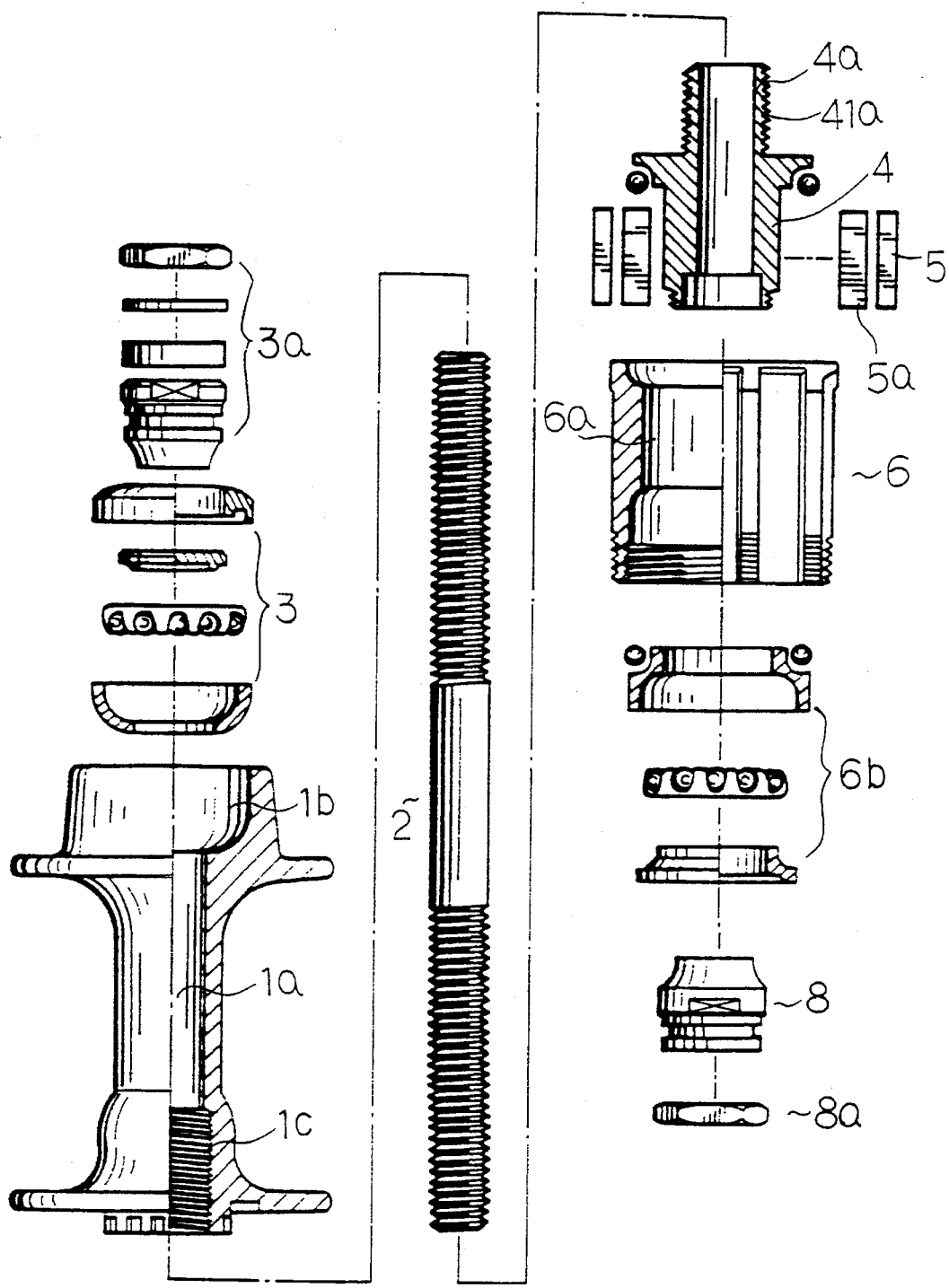
FIG. 2 is an exploded schematic view of another conventional aluminum alloy rear hub mechanism of a bicycle.
Figure 3A:
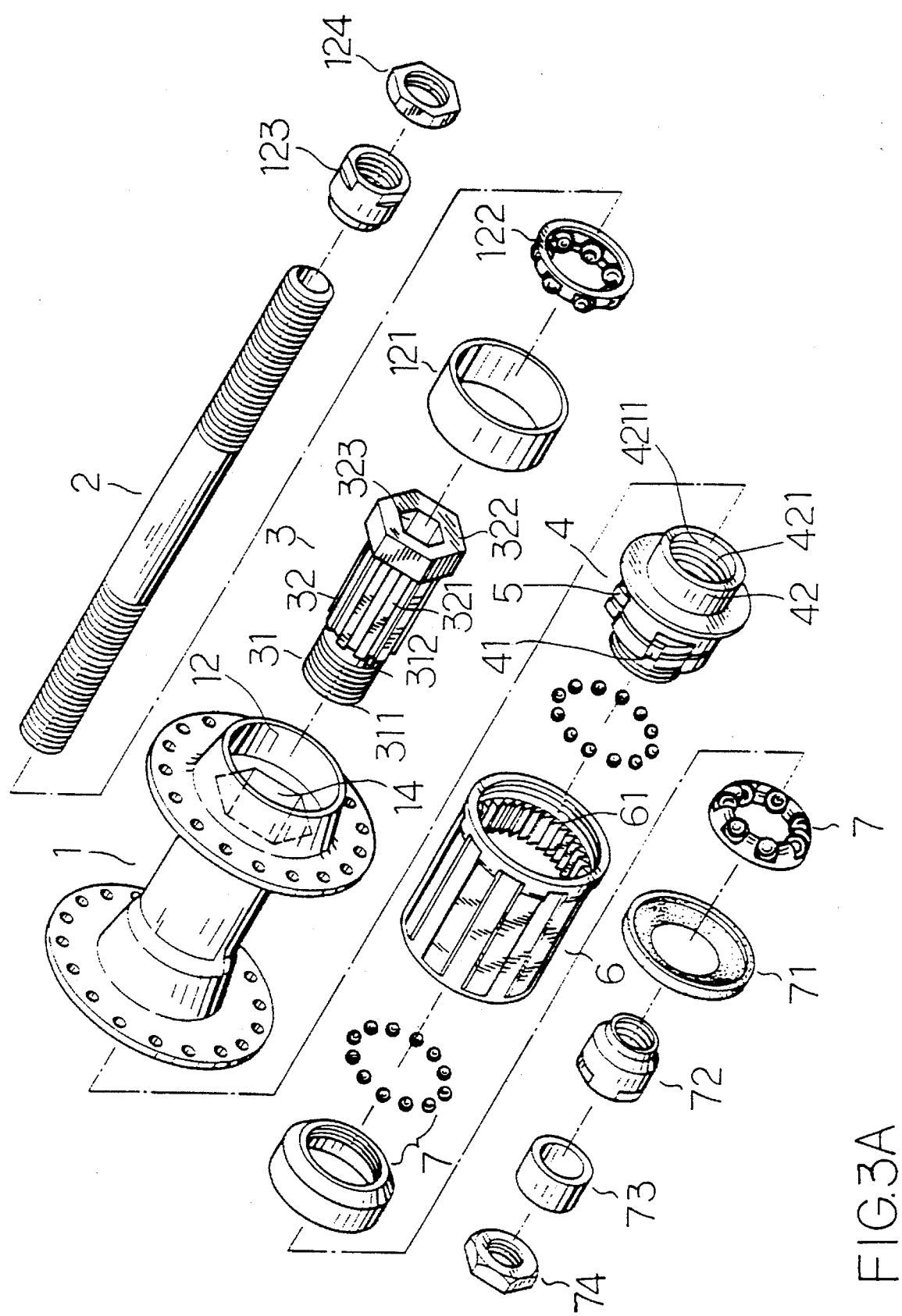
FIG. 3A is a perspective exploded view of a first preferred embodiment of the present invention.
Figure 3B:
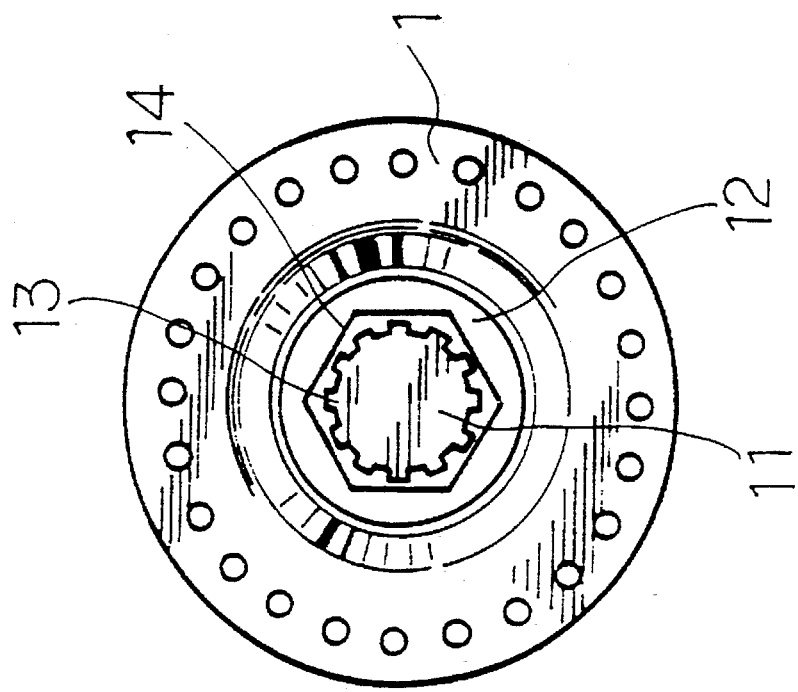
FIG. 3B is a sectional view of the driving assembly of the present invention.
Figure 4:
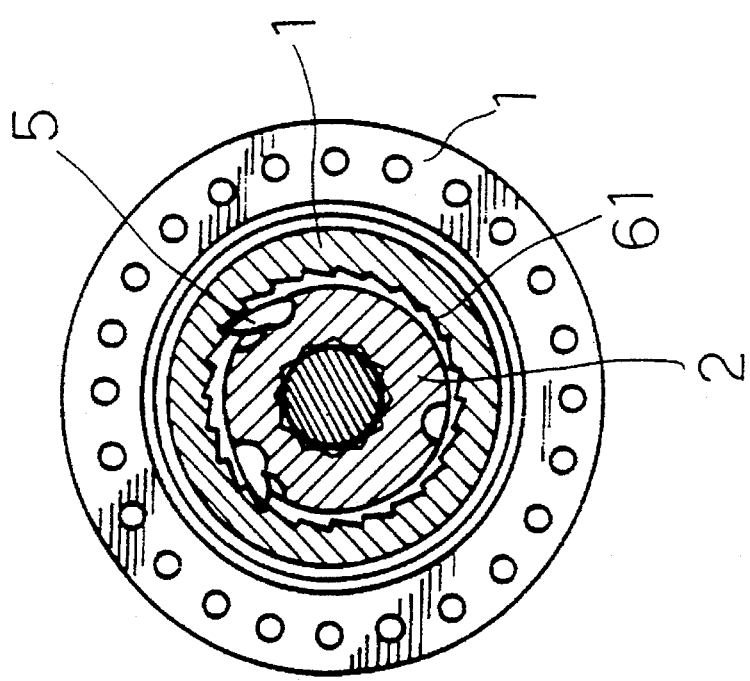
FIG. 4 is a partial sectional schematic view of the driving elements according to the present invention.
Figure 5B:
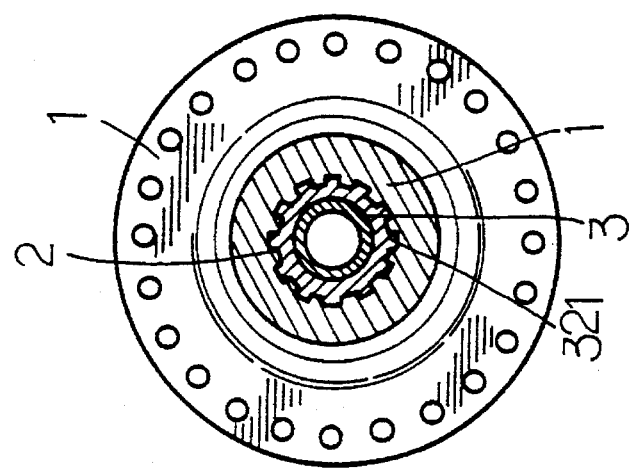
FIG. 5B is a horizontal sectional schematic view of the present invention taken along line A—A.
Figure 5A:
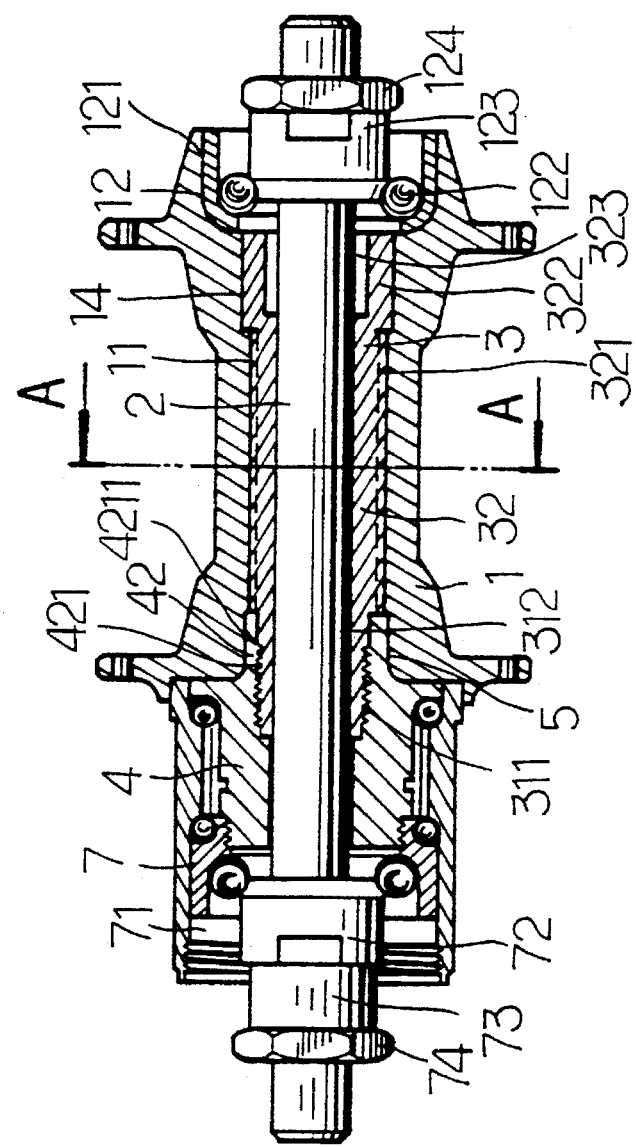
FIG. 5A is an axial sectional schematic view of the present invention after it is assembled.

With reference to FIGS. 3A, 3B, 4, 5A and 5B, the improved rear hub transmission mechanism for use in bicycles according to the present invention comprises a hub body 1 having a central through hole 11 for insertion of an axle 2. One end of the hub body 1 is provided with a slot 12 which may receive, in sequence, ball race 121, a ball nest 122 and an axial sleeve 123. The inner surface of the through hole 11 of the hub body 1 is circumferentially axially provided with a plurality of elongated grooves 13. One end of the through hole 11 is provided with a deep polygonal (e.g., hexagonal) hole 14, as that shown in FIGS. 3A and 3B. The other end of the through hole 11 is provided with a deep round hole 15 (as shown in FIG. 5). The present invention further comprises a sleeve 3 having a lower section 31 of a smaller diameter. The lower section 31 of the sleeve 3 has external threads 311 the upper part thereof is configured to be a bracing section 312. An upper section 32 of the sleeve 3 is a main body of the sleeve 3 with a greater diameter and is circumferentially axially provided with a plurality of elongated grooves 321 therein. One end of the upper section 32 of the sleeve 3 is provided with a polygonal (hexagonal) flange 322 for matching the polygonal (hexagonal) hole 14 at one end of the through hole 11 of the hub body 1. The polygonal flange 322 is provided with a polygonal (hexagonal) orifice 323. The sleeve 3 is inserted into the through hole 11 of the hub body 1, with the elongated grooves 321 in the upper section 32 of the sleeve 3 locking into the elongated grooves 13 in the inner surface of the through hole 11. The polygonal flange 322 just fits into the polygonal hole 14 at one end of the through hole 11 and is positioned therein, as shown in FIG. 5A. The axle 2 is locked onto the hub body by means of a nut 124.

Figure 6:
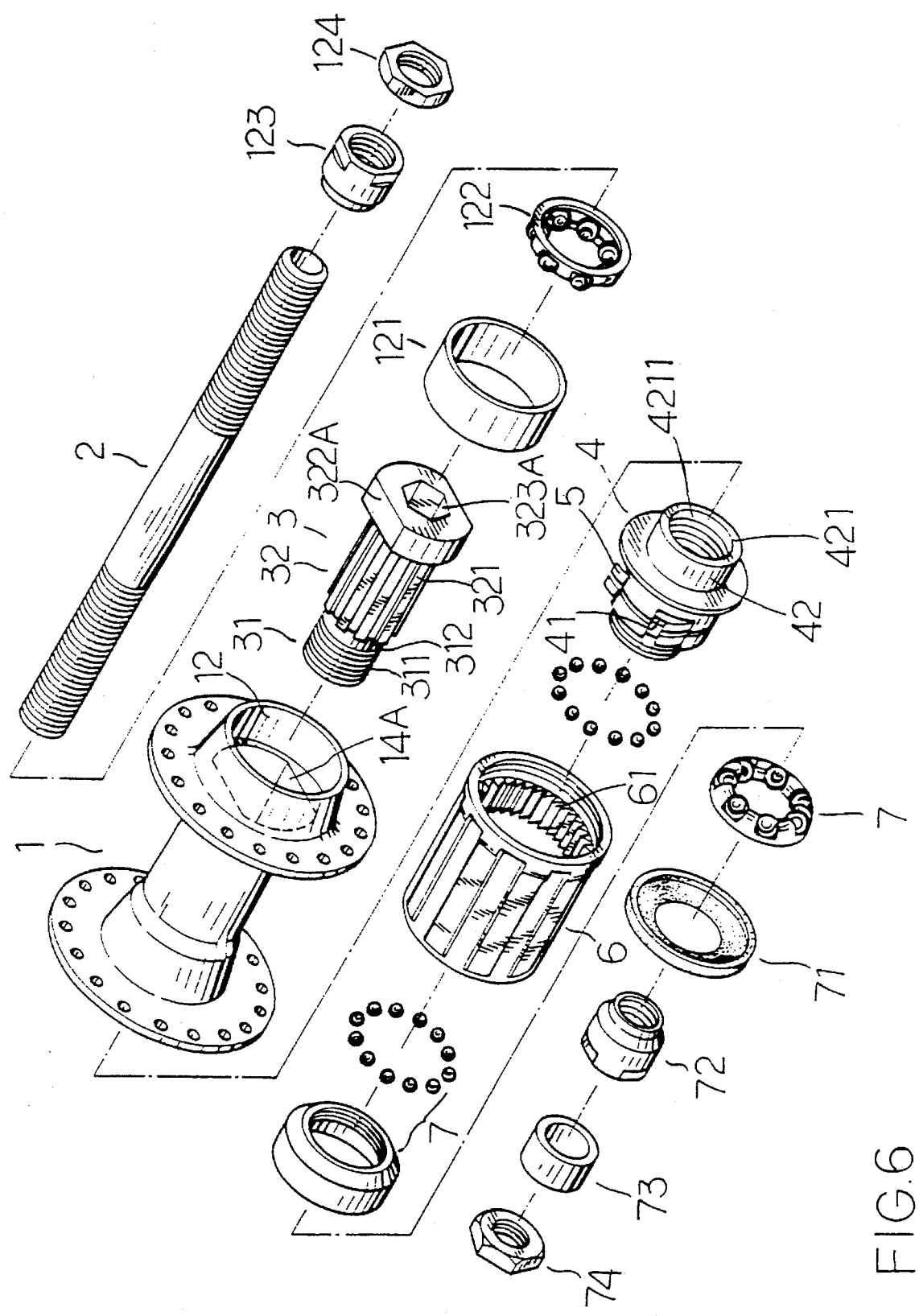
FIG. 6 is a schematic view of a second preferred embodiment of the present invention.

A driving assembly consisting of a mounting 4, a predetermined number of retaining elements 5 and a gear seat 6. The circumferential surface of the mounting 4 is provided with a pre-determined number of notches 41 for receiving the retaining elements 5. Each of these retaining elements 5 may be pressed against by a resilient member at any time. The internal circumferential surface of one end of the mounting 4 is provided with a tube 42 having internal threads 421. A small section above the internal threads 421 of the tube 42 forms a smooth bracing surface 4211. The tube 32 is passed through the axle 2 and is fitted into the round hole 15 at one end of the through hole 11 of the hub body 1. At the same time, the external threads 311 of the lower section 31 of the sleeve 3 inside the through hole 11 of the hub body 1 are locked into the internal threads 421 of the tube 42 at one end of the mounting 4. The bracing section 312 of the sleeve 3 just fits tightly with the smooth bracing section 4211 of the tube 42 of the mounting 4, as shown in FIG. 5A. The internal circumferential surface of the gear seat 6 is also provided with tooth-like ratchet 62 for engagement with the retaining elements 5 on the mounting 4, as shown in FIG. 6. One end of the gear seat 6 is fitted with a ball bearing set 7 and a protective cover 71, so that, by means of a socket 72, a jacket 73 and a nut 74, the above-mentioned components may be positioned firmly on the hub body 1. The outer surface of the gear seat 6 is securely provided with a gear so that, by means of the assembly of the mechanism described above, when the gear is driven, the hub body 1 may be turned unidirectionally therewith.

With further reference to FIGS. 4, 5A and 5B, in the above-mentioned mechanism, when the hub body 1 is rotated due to rotation of the gear seat 6 by the gear, the internal ratchet 61 of the gear seat 6 engage with the retaining elements 5 of the mounting 4 to rotate the mounting 4, which in turn rotates the sleeve 3. The polygonal flange 321 at one end of the sleeve 3 retains the rim of the polygonal hole 14 at one end of the through hole 11 of the hub body 1, while the elongated grooves 321 in the upper section 32 of the sleeve 3 lock into the elongated grooves 13 in the inner surface of the through hole 11, bringing the hub body 1 to rotate forward therewith, as shown in FIG. 6. But when the gear rotates backward, the internal ratchet 61 of the gear seat 6 release the retaining elements 5 of the mounting 4 to generate idle rotation. By utilizing the sleeve 3 at an end remote from the gear to drive the hub body 1 may solve the problem of torque concentration resulted from driving the hub body 1 from the end near the gear. And by means of the radial distribution of stress on the sleeve 3, torque concentration may be prevented. Besides, by means of an increased linking-up contact surface between the sleeve 3 and the hub body 1, the axial support force of the sleeve 3 may be enhanced and the shock absorbing capacity of the hub body may also be increased, eliminating the problem of loosening of the hub transmission mechanism. In addition, the round hole 15 at one end of the through hole 11 of the hub body 1 and the tube 42 of the mounting 4 are formed in NC90 degrees, having better concentricity. Furthermore, the contact surface between the mounting 4 and the hub body 1 as well as the outer plane of the round hole 15 of the hub body 1 have greater and more even contact effects, providing better coupling precision between the mounting 4 and the hub body 1.

The sleeve 3 is fitted into the through hole 11 of the hub body 1 with the external threads 311 of its lower section 31 locking into the internal threads 421 of the tube 42 at one end of the mounting 4. The bracing section 312 of the lower section 31 of the sleeve 3 just fits with the bracing surface 4211 at the outer end of the internal threads 421 of the tube 42 of the mounting 4, so that the sleeve 3 and the mounting 4 are firmly joined together to prevent the sleeve 3 from locking into the internal threads 421 of the tube 42 of the mounting 4 when the hub body 1 rotates forward. And because the sleeve 3 and the mounting 4 are both made of rigid material, the hub body 1 will not easily become loosened after it is pressed by the sleeve 3 when the mounting 4 rotates; the sleeve 3 and the internal threads 421 of the tube 42 of the mounting 4 may not easily be damaged too. Hence, the sleeve 3, the hub body 1 and the mounting 4 are more firmly secured together. The present invention provides improvements in even distribution of stress and better coupling precision and firmness in assembly, preventing slippage or breaking of the chain of the bicycle and increasing the duration of the bicycle.

In a second preferred embodiment of the present invention, the flange 322 of the upper section 32 of the sleeve 3 may be designed to be a circular flange 322A with two opposite parallel planes, and the flange 322A having a hexagonal orifice 323A. Correspondingly, the hole 14 at one end of the through hole 11 of the hub body 1 may be configured to be a hole 14A having a shape matching that of the circular flange 322A, as shown in FIGS. 4, 5A and 6.

Figure 7:
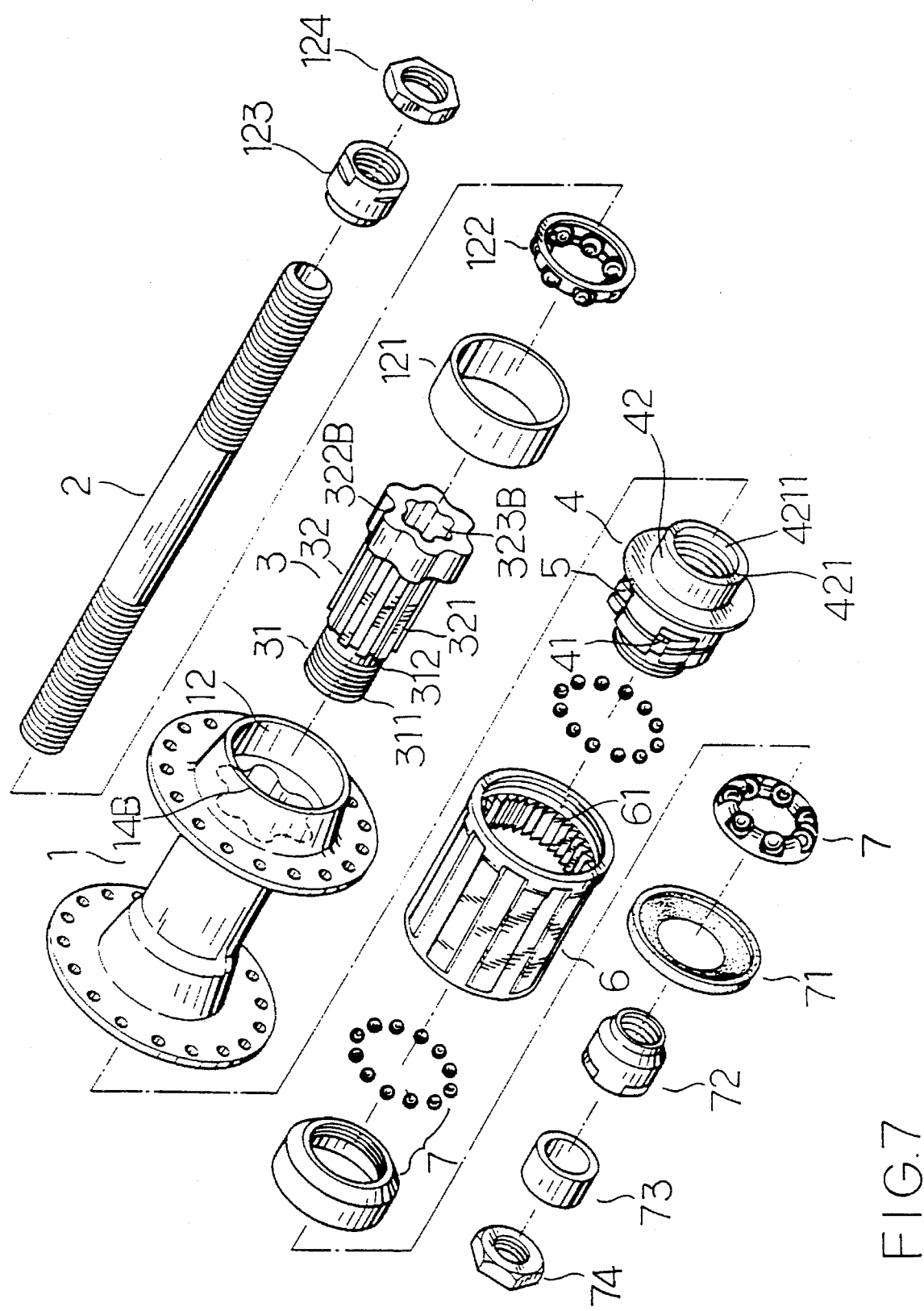
FIG. 7 is a schematic view of a third preferred embodiment of the present invention.

In a third preferred embodiment of the present invention, the flange 322 of the upper section 32 of the sleeve 3 may also be configured to be a floral flange 322B with a floral orifice 323B. Correspondingly, the hole 14 at one end of the through hole 11 of the hub body 1 may also be configured to be a hole 14B having a shape resembling that of the floral flange 322B, as shown in FIGS. 4, 5A and 7.

Figure 8:
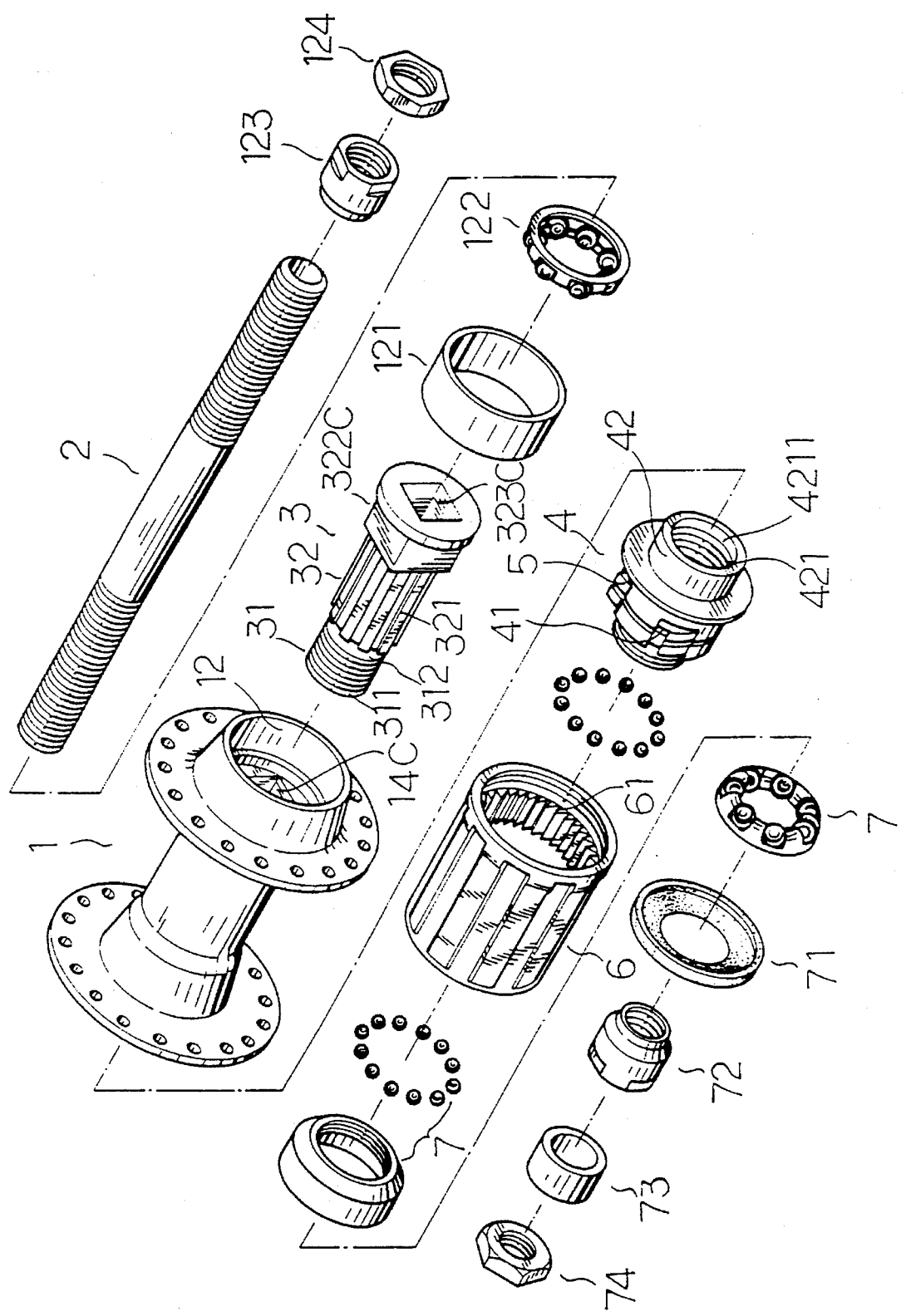
FIG. 8 is a schematic view of a fourth preferred embodiment of the present invention.

In a fourth preferred embodiment of the present invention, the flange 322 of the upper section 32 of the sleeve 3 may also be configured to be a flange 322C with a circular head and a cubic body and having a quadrilateral orifice 323C. Correspondingly, the hole 14 at one end of the through hole 11 of the hub body 1 may also be configured to be a hole 14C having a shape resembling that of the flange 322C, as shown in FIGS. 4, 5A and 8.

Figure 9:
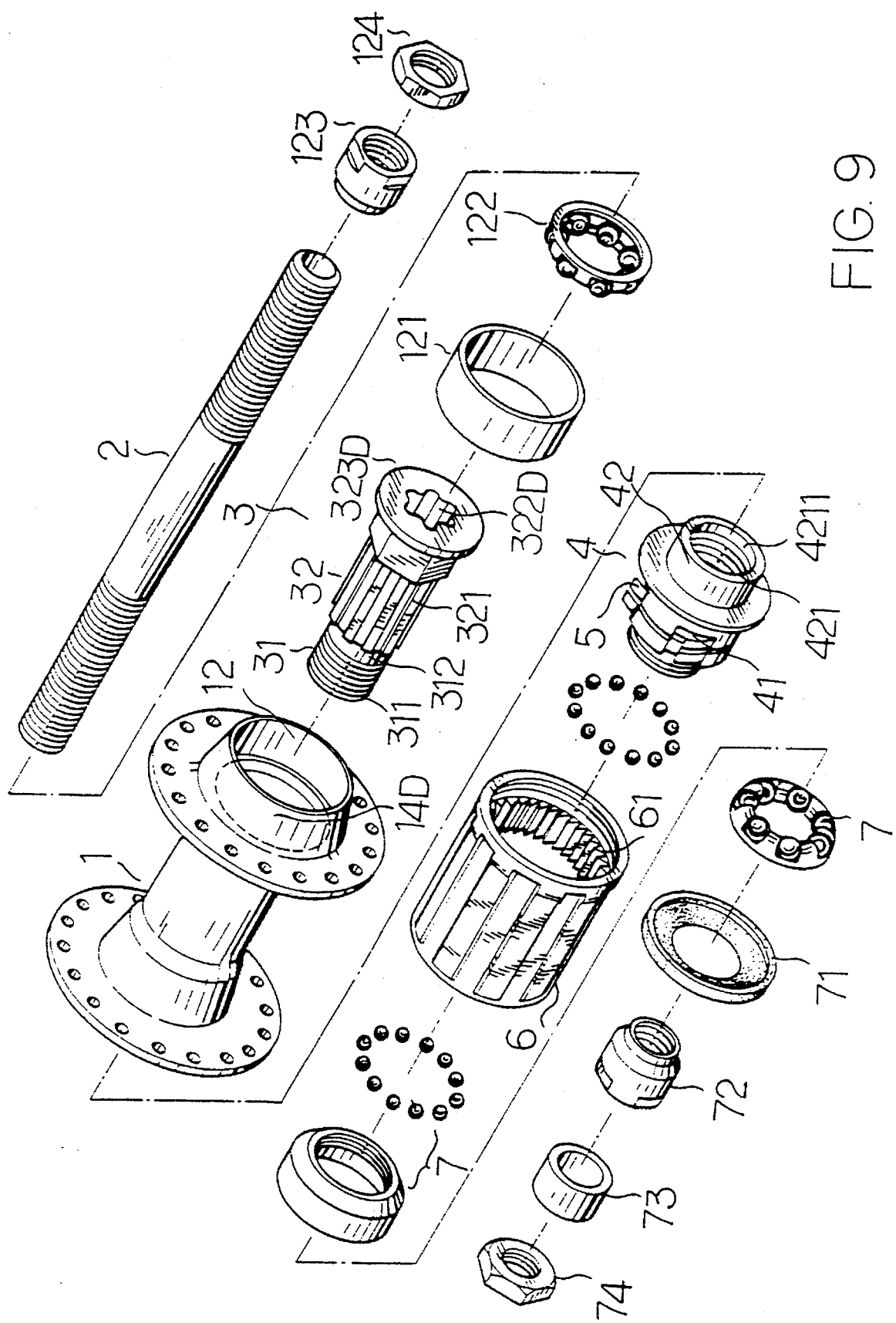
FIG. 9 is a schematic view of a fifth preferred embodiment of the present invention.

In a fifth preferred embodiment of the present invention, the flange 322 of the upper section 32 of the sleeve 3 may also be configured to be a flange 322D with circular head and a hexagonal body and having a floral orifice 323D. Correspondingly, the hole 14 at one end of the through hole 11 of the hub body 1 may also be configured to be a hole 14B having a shape resembling that of the flange 322D, as shown in FIGS. 4, 5A and 9.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved rear hub transmission mechanism for use in bicycles, said mechanism comprising a hub body having a central through hole for insertion of an axle, one end thereof being provided with a ball bearing slot for receiving, in sequence, a ball race, a ball nest and an axial sleeve; a sleeve inserted into said through hole of said hub body via one end of said through hole, said sleeve being positioned within said hub body by means of a nut screwably provided on said axle; and a driving assembly consisting of a mounting, a pre-determined number of retaining elements and a gear seat, said mounting having a pre-determined number of notches circumferentially provided therein for acccommodating said retaining elements, said retaining elements being pressed against by a resilient member, one end of said mounting being provided with a tube which passes through said axle into a round hole at one end of said through hole of said hub body, an inner surface of said gear seat being provided with internal ratchet for meshing with said retaining elements of said mounting, one end of said gear seat being fitted with a ball bearing set and a protective cover so that by means of a socket, a jacket and a nut, all components are pressed tightly onto said hub body, an outer surface of said gear seat being provided with a driving gear for driving said hub body unidirectionally, wherein an inner surface of said through hole of said hub body is circumferentially axially provided with a plurality of elongated grooves and one end of said through has a polygonal hole;

said sleeve has a lower section of a smaller diameter and which is provided with external threads and a bracing section above said external threads, and an upper section of a greater diameter which forms a sleeve body having a plurality of elongated grooves circumferentially and axially disposed therein, said upper section of said sleeve having a polygonal flange at one end thereof for matching with said polygonal hole at one end of said through hole of said hub body, said polygonal flange having a polygonal orifice in the center thereof, said elongated grooves of said upper section of said sleeve locking with said elongated grooves in the inner surface of said through hole when said sleeve is inserted into said through hole of said hub body, with said polygonal flange of said upper section of said sleeve fitting in with said polygonal hole of said through hole;

said tube at one end of said mounting is provided with internal threads and a smooth bracing surface above said internal threads, said external threads of said lower section of said sleeve inserted into said through hole engaging with said internal threads of said tube of said mounting when said tube is passed through said axle into one end of said through hole of said hub body, and said bracing section of said lower section of said sleeve pressing tightly against said bracing surface of said tube of said mounting to prevent said sleeve from moving forward.

2. An improved rear hub transmission mechanism as claimed in claim 1, wherein said flange of said upper section of said sleeve is configured to be a circular flange with two opposite parallel planes and having a hexagonal orifice, and said polygonal hole at one end of said through hole of the hub body is configured to be a hole having a shape matching that of said circular flange.

3. An improved rear hub transmission mechanism as claimed in claim 1, wherein said flange of said upper section of said sleeve is configured to be a floral flange with a floral orifice, and said hole at one end of said through hole of said hub body is configured to be a hole having a shape resembling that of said floral flange.

4. An improved rear hub transmission mechanism as claimed in claim 1, wherein said flange of said upper section of said sleeve is configured to be a flange element with a circular head and a cubic body and having a quadrilateral orifice, and said hole at one end of said through hole of said hub body is configured to be a hole having a shape resembling that of said flange element.

5. An improved rear hub transmission mechanism as claimed in claim 1, wherein said flange of said upper section of said sleeve is configured to be a flange element with a circular head and a hexagonal body and having a floral orifice, and said hole at one end of said through hole of the hub body is configured to be a hole having a shape resembling that of the flange element.

* * * * *